Figure 3:
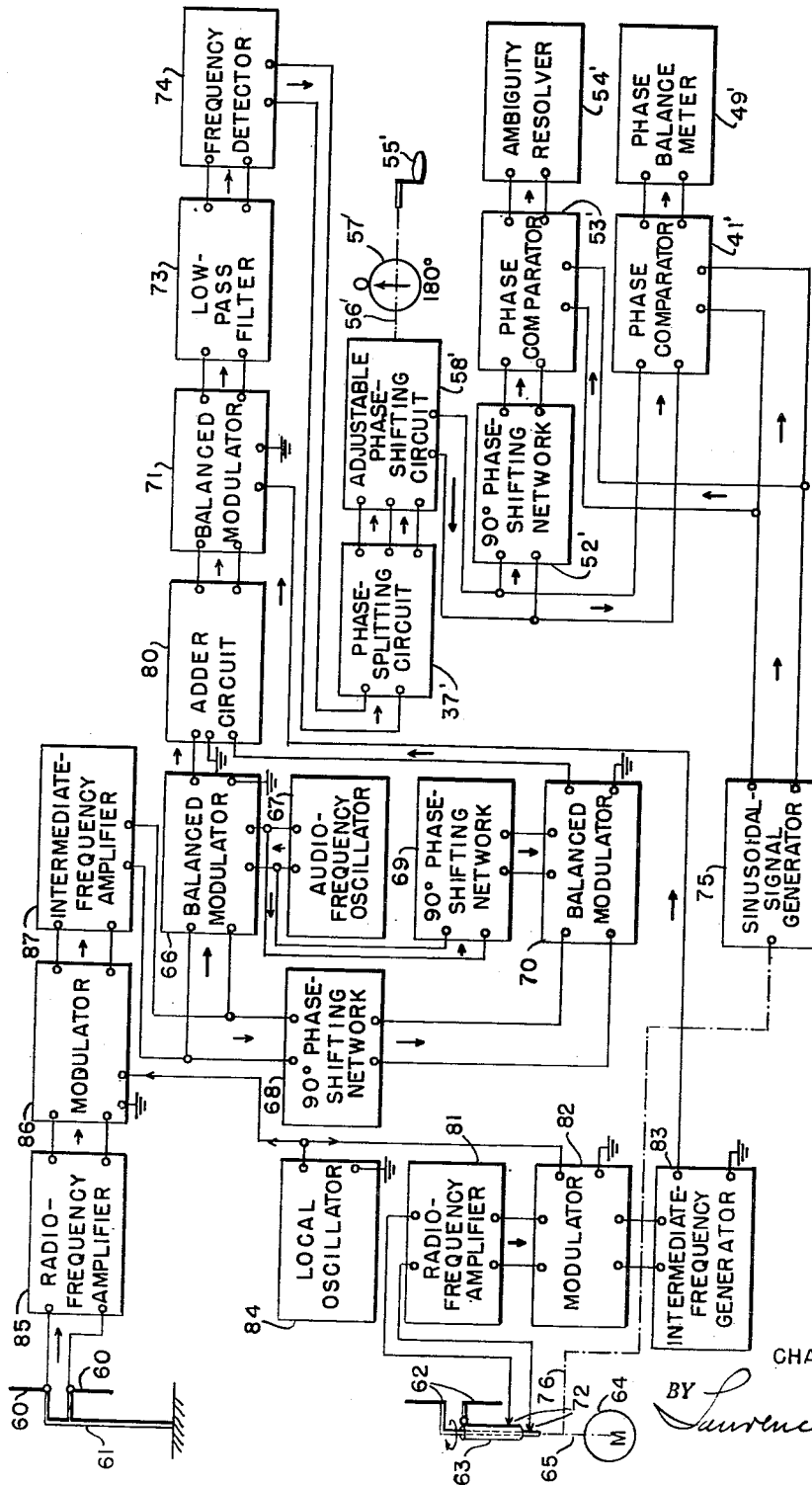

Aug. 17, 1954 C. J. HIRSCH 2,686,910
WAVE-SIGNAL TRANSMITTING SYSTEM
Filed Feb. 9, 1952 2 Sheets-Sheet 1
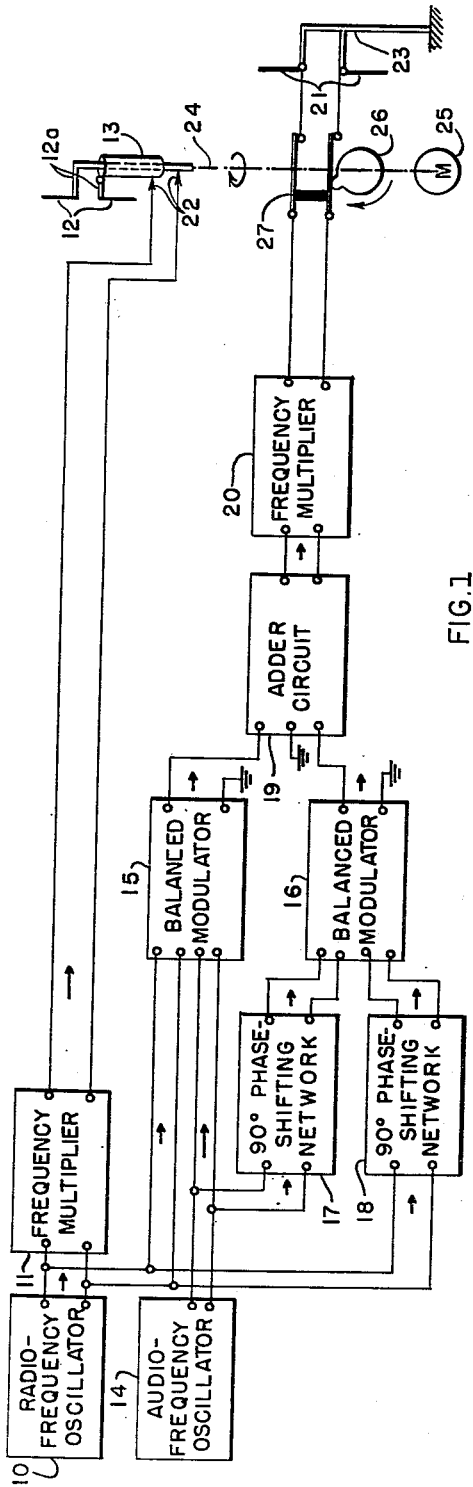
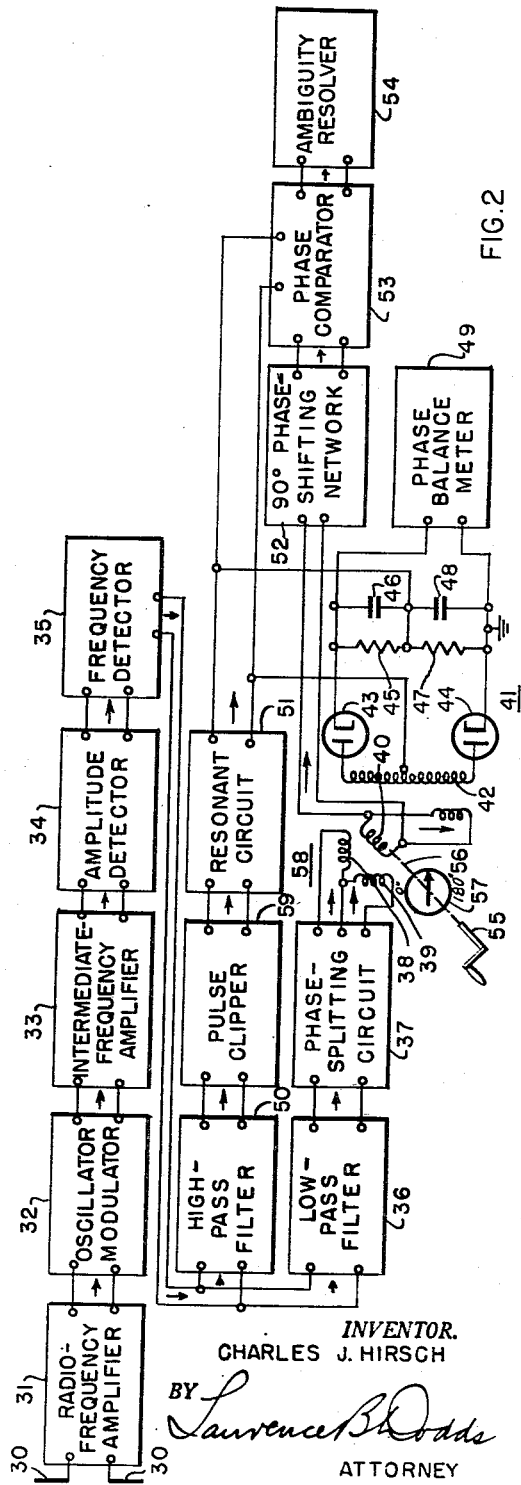
INVENTOR.
CHARLES J. HIRSCH
BY
ATTORNEY Aug. 17, 1954

C. J. HIRSCH 2,686,910

WAVE-SIGNAL TRANSMITTING SYSTEM

Filed Feb. 9, 1952

2 Sheets-Sheet 2

INVENTOR.
CHARLES J. HIRSCH
BY Laurence B. Dodds
ATTORNEY

Patented Aug. 17, 1954

2,686,910

UNITED STATES PATENT OFFICE 2,686,910

WAVE-SIGNAL TRANSMITTING SYSTEM

Charles J. Hirsch, Douglaston, N. Y., assignor to Hazeltine Research, Inc., Chicago, Ill., a corporation of Illinois Application February 9, 1952, Serial No. 270,880

15 Claims. (Cl. 343—102)

This invention relates, in general, to wave-signal transmitting systems and especially to such systems of the type which transmits two wave signals having effective relative angular velocities representative of the direction of propagation thereof. Such a transmitting system is particularly useful as an omnidirectional range transmitter and, hence, will be described in that environment. More particularly, the invention relates to antenna systems of the type which may be utilized in the transmitting system for translating two wave signals having effective relative angular velocities representative of the direction of propagation thereof.

One omnidirectional range transmitter heretofore proposed transmits in all directions a wave signal having a directional field-strength characteristic which represents the directions of propagation of the wave signal. To this end, the system utilizes an antenna array for radiating a wave signal having a cardioid-shaped directional field-strength characteristic which is cyclically rotated by changing the phase of signals applied to various antennas. Accordingly, a transmitted signal intercepted by a distant receiver having a given bearing relative to the transmitter has an amplitude characteristic representative of the direction of propagation of the transmitted signal. Although such an omnidirectional range transmitter has proved useful, the transmitter has the disadvantage of requiring a more complex antenna array and associated circuits than are desirable in some cases.

It is an object of the present invention, therefore, to provide a new and improved wave-signal transmitting system which avoids one or more of the above-mentioned disadvantages of systems heretofore proposed.

It is another object of the invention to provide a new and improved wave-signal transmitting system for transmitting two wave signals having in each direction of propagation effective instantaneous relative angular velocities representative of the direction of propagation.

It is another object of the invention to provide a new and improved wave-signal radiating system which may be utilized in the above-mentioned transmitting system for radiating two wave signals having effective instantaneous relative angular velocities in any direction of propagation representative of that direction.

It is another object of the invention to provide a new and improved wave-signal intercepting system for deriving from a propagated wave signal two wave signals having effective instantaneous relative angular velocities corresponding to any direction of propagation of the propagated signal which are representative of that direction.

In accordance with a particular form of the invention, a wave-signal transmitting system for transmitting two wave signals having in each direction of propagation effective instantaneous relative angular velocities representative of the direction of propagation comprises a circuit for substantially simultaneousuly supplying two wave signals and at least a pair of antennas individually and substantially simultaneously responsive to the supplied signals for deriving therefrom wave signals for transmission. The effective position of derivation of one of the transmitted signals by at least one of the antenna is movable along a nonlinear path and has a velocity in the direction of propagation of the transmitted signals relative to the other of the antennas which varies in accordance with displacements along the path. The transmitting system also includes means for cyclically moving the aforesaid effective signal-deriving position along the path cyclically to vary in accordance with variations of the relative velocity of the aforesaid position the effective instantaneous relative angular velocities of the transmitted signals in each direction of propagation. The aforesaid instantaneous relative angular velocities of the transmitted signals in any direction of propagation are representative of the direction of propagation.

Also in accordance with a particular form of the invention, an antenna system responsive to primary wave-signal energy for deriving therefrom two wave signals having cyclically varying effective relative angular velocities comprises at least a pair of antennas individually and substantially simultaneously responsive to the primary wave-signal energy for deriving therefrom wave-signal energy comprising two translating wave signals. One of the primary and derived wave-signal energies is propagated energy. The effective position of derivation of one of the signals by at least one of the antennas is movable along a nonlinear path and has during the entire operating period of the system a variable displacement component in each direction of propagation of the propagated energy. The aforesaid effective position also has during the entire operating period a velocity in each direction of propagation of the propagated energy relative to the other of the antennas which varies in accordance with displacements along the path. The antenna system also includes means for cyclically moving the aforesaid effective signal-deriving position along the path cyclically to vary the effective instantaneous relative angular velocities of the two derived signals. The instantaneous relative angular velocities of the derived signals corresponding to any direction of propagation of the propagated energy are representative of that direction.

For a better understanding of the present invention, together with other and further objects thereof, reference is had to the following description taken in connection with the accompanying drawings, and its scope will be pointed out in the appended claims.

In the accompanying drawings, Fig. 1 is a circuit diagram representing a wave-signal transmitting system constructed in accordance with the invention and including an antenna system also constructed in accordance with the invention; Fig. 2 is a circuit diagram, partly schematic, of a receiver which may be utilized in conjunction with the Fig. 1 transmitting system; and Fig. 3 is a circuit diagram which represents a direction-finding receiver including an antenna system constructed in accordance with the invention.

Description of Fig. 1 transmitting system

Referring now more particularly to Fig. 1 of the drawings, there is represented a wave-signal transmitting system which may be located on the ground for transmitting two wave signals having in each direction of propagation effective instantaneous relative angular velocities representative of the direction of propagation. The transmitting system comprises a supply circuit for supplying two wave signals preferably having different frequencies. Specifically, the supply circuit includes a conventional radio-frequency oscillator 10 for developing an output signal having a frequency which, for example, may be of the order of 100 megacycles. The output circuit of the radio-frequency oscillator 10 is connected to a suitable frequency multiplier 11 which may comprise successive frequency-multiplying amplifiers for multiplying the frequency of the signal applied thereto by a factor of, for example, 10. The frequency multiplier is, in turn, coupled to an antenna 12, 12 more fully to be described hereinafter, through a pair of brushes 22, 22 and a rotatable coaxial transmission line 13 of rigid construction.

The supply circuit also includes an audio-frequency oscillator 14 of conventional construction for supplying an output signal having a frequency of, for example, 40 cycles. The output circuit of the audio-frequency oscillator 14 is connected to one input circuit of a balanced modulator 15 having another input circuit connected to the output circuit of the radio-frequency oscillator 10. The balanced modulator 15 may be of a conventional type for developing in its output circuit a signal representative of the product of the signals applied to the input circuits thereof and which does not contain frequency components at the applied signal frequencies.

The audio-frequency oscillator 14 is also coupled to an input circuit of a balanced modulator 16 through a 90° phase-shifting network 17 which may comprise suitable resistive and reactive components for developing an output audio-frequency signal having a phase differing by 90° from the input signal applied thereto. Similarly, the radio-frequency oscillator 10 is coupled to another input circuit of the balanced modulator 16 through a conventional 90° phase-shifting network 18 for shifting the phase of the high-frequency signal applied thereto by 90°. The balanced modulator 16 may be generally similar in construction to the balanced modulator 15.

The output circuits of the balanced modulators 15 and 16 are connected to an adder circuit 19 which may comprise, for example, conventional high-impedance combining amplifier circuits. The adder circuit 19 is coupled to an antenna 21, 21 presently to be described, through a frequency multiplier 20 which may be similar in construction to the frequency multiplier 11 and preferably multiplies the frequency of the signal applied thereto by the same factor as the frequency multiplier 11, for example 10, to supply an output signal having a frequency of, for example, 999.9996 megacycles.

Antennas 12, 12 and 21, 21 included in the wave-signal transmitting system are individually responsive to primary wave-signal energy, specifically, the supplied signals developed by the supply circuit just described, and are effective to derive therefrom two wave signals for transmission as radiated wave signals. Each of antennas 12, 12 and 21, 21 preferably is an omnidirectional substantially coaxial vertical dipole antenna suitable for high-frequency operation. The effective position of derivation of one of the transmitted wave signals by at least one of the antennas is movable along a nonlinear path which preferably is a closed curvilinear or circular path. By this expression it is meant that at least one antenna may be movable along a nonlinear path or that any well-known electrical equivalent thereof for moving the effective signal-deriving position along a nonlinear path may be substituted therefor. For the purposes of illustration, a movable antenna is represented in the drawing. Further, motion of an antena along a nonlinear path is meant to indicate motion involving translatory displacements of the antenna rather than rotational movement of the antenna about its own axis. To this end, the antenna 12 is conductively attached by a pair of transverse arms 12a, 12a of, for example, about 30 centimeters in length to the transmission line 13 which is rotatable about its longitudinal axis and serves as a support for the antenna 12. The antenna 21, 21 preferably is fixedly positioned, such as by attachment to a stationary insulated support 23, the antenna 12, 12 accordingly having a velocity in the direction of propagation of the transmitted signals relative to the antenna 21 which varies in accordance with displacements of the antenna 12 along the aforesaid nonlinear path.

The transmission-line support 13 for the antenna 12, 12 is mechanically connected, as indicated by a dot-dash line 24, to means comprising a motor 25 for cyclically moving the aforesaid effective signal-deriving position along the aforesaid path, preferably at a constant speed, cyclically to vary in accordance with variations of the relative velocity of the position the effective instantaneous relative angular velocities of the transmitted signals in each direction of propagation, these effective instantaneous relative angular velocities in any direction of propagation being representative of the direction of propagation.

The transmitting system also includes means for interrupting the transmission of one of the transmitted signals during a predetermined portion of each cycle of movement of the antenna 12, 12 periodically to represent the relative positions of the antennas 12, 12 and 21, 21. Specifically, this means comprises a rotatable cam 26 and a snap-action, normally closed, double-pole switch 27 connecting the output circuit of the frequency multiplier 20 to the antenna 21, 21. The cam 26 is mechanically connected to the motor 25 for movement thereby in accordance with the movement of the antenna 12, 12.

*Operation of Fig. 1 transmitting system*

Considering now the operation of the Fig. 1 transmitting system (where the arrows indicate the directions of signal translation), the radio-frequency oscillator 10 develops in its output circuit a signal which may be represented by the following equation:

$$e = E \sin \frac{\omega t}{n} \quad (1)$$

where $e$ = instantaneous valve of the output signal of unit 10

$E$ = amplitude of the output signal of unit 10

$\frac{\omega}{n}$ = angular velocity of the output signal of unit 10

$t$ = time

This signal is applied to the frequency multiplier 11 which multiplies the frequency of the signal by a factor $n$ to derive therefrom a signal which may be represented by the following equation:

$$e_0 = kE \sin \omega t \quad (2)$$

where $e_0$ = instantaneous value of the output signal of unit 11

$k$ = amplification factor of unit 11

The output signal of the unit 11 is applied through the transmission line 13 to the antenna 12 which operates in a manner to be described subsequently.

The audio-frequency oscillator 14 applies to the input circuit of the balanced modulator 15 a signal which may be represented by:

$$e_1 = E_1 \sin \frac{\omega_1 t}{n} \quad (3)$$

where $e_1$ = instantaneous value of the output signal of the unit 14

$E_1$ = amplitude of the output signal of the unit 14

$\frac{\omega_1}{n}$ = angular velocity of the output signal of the unit 14

The output signal of the radio-frequency oscillator 10 is also applied to the balanced modulator 15 which derives from the two input signals supplied thereto and expressed by Equations 1 and 3 an output signal which may be represented by:

$$e_2 = k_2 E E_1 \sin \frac{\omega t}{n} \sin \frac{\omega_1 t}{n} \quad (4)$$

where $k_2$ = amplification factor of unit 15.

The output signals of the oscillators 10 and 14 expressed by Equations 1 and 3 are also applied to the 90° phase-shifting networks 18 and 17, respectively, which derive therefrom the signals represented by Equations 5 and 6, respectively:

$$e_3 = k_3 E \cos \frac{\omega t}{n} \quad (5)$$

where $e_3$ = instantaneous value of output signal of unit 18

$k_3$ = attenuation factor of unit 18

$$e_4 = k_4 E_1 \cos \frac{\omega_1 t}{n} \quad (6)$$

where $e_4$ = instantaneous value of output signal of unit 17

$k_4$ = attenuation factor of unit 17

The phase-shifting networks 18 and 17 apply the output signals represented by Equations 5 and 6 to the input circuits of the balanced modulator 16 which derives therefrom an output signal representative of the product of the input signals and indicated by:

$$e_5 = k_5 E E_1 \cos \frac{\omega t}{n} \cos \frac{\omega_1 t}{n} \quad (7)$$

where $e_5$ = instantaneous value of output signal of unit 16

$k_5$ = effective combined amplification and attenuation factors of units 16, 17, 18

The balanced modulators 15 and 16 apply the output signals thereof, expressed by Equations 4 and 7, to the adder circuit 19 which develops for application to the frequency multiplier 20 a signal representative of the sum of the output signals of the modulators 15 and 16. The output signal of the adder circuit 19 is represented by:

$$e_6 = E_6 \cos \frac{(\omega - \omega_1)t}{n} \quad (8)$$

where $e_6$ = instantaneous valve of output signal of unit 19

$E_6$ = amplitude of output signal of unit 19

The frequency multiplier 20 multiplies the frequency of the signal represented by Equation 8 by a factor $n$ to develop in its output circuit an amplified signal which may be represented by:

$$e_7 = k_7 E_6 \cos (\omega - \omega_1) t \quad (9)$$

where $e_7$ = instantaneous value of output signal of unit 20

$k_7$ = amplification factor of unit 20

The output signal of the frequency multiplier 20 is applied through the switch 27 to the stationary antenna 21, 21.

The motor 25 rotates the transmission-line support 13 about its longitudinal axis causing the antenna 12, 12 to move along a circular path having a radius of, for example, 30 centimeters. The motor 25 preferably cyclically revolves the antenna 12 at a frequency of, for example, 30 revolutions per second, which is less than the quotient of the product of the frequency difference of the two signals supplied by the frequency multipliers 11 and 20 and the velocity of propagation of those signals in free space divided by the product of the length of the aforesaid path and the frequency of the signal supplied to the movable antenna 12. Assuming that the antenna 12 revolves clockwise about the longitudinal axis of the transmission-line support 13, the component of the velocity of the antenna 12, 12 in a given direction of propagation of the signal transmitted thereby may be expressed by:

$$V = \omega_r d (\sin \omega_r t - \theta) \quad (10)$$

where $V$ = instantaneous magnitude of the component of the velocity of the antenna 12 in a given direction of propagation $\omega_r$ = angular velocity of revolution of the antenna 12

$d$ = length of the radius of circular path of the antenna 12

$\theta$ = angle between the given direction of propagation and a reference direction Because of the well-known Doppler effect, the movement of the antenna 12, 12 varies the effective angular velocity of the signal transmitted thereby in any given direction. From Equation 10 and the explanation of Doppler effect at pages 287–290 of the text "Radar Engineering" by Donald G. Fink, first edition, McGraw-Hill, 1947, it will be seen that the variation in the effective angular velocity of the transmitted signal in a given direction may be expressed by:

$$\Delta \omega = \frac{-\omega_r \omega d}{c} \sin(\omega_r t - \theta) \quad (11)$$

where $\Delta \omega$=instantaneous angular velocity deviation of the signal transmitted by antenna 12, 12
$c$=velocity of propagation in free space of the signal transmitted by antenna 12, 12

Thus, assuming that north is a reference direction, or, in other words, that $\omega_r t=0$ when the antenna 12 is at its most northerly position so that $\theta=0$ for signals propagated due north, the angular velocity and frequency of the signal transmitted by the antenna 12, 12 and intercepted by a receiver due north of the antenna vary sinusoidally in accordance with the movement of the antenna 12, 12. As the antenna revolves clockwise from its most northerly to its most easterly position, the frequency of the signal intercepted by the receiver due north of the antenna decreases to a minimum value and, as the antenna moves clockwise from its most easterly to its most westerly position, the frequency of the signal intercepted by the receiver increases from a minimum to a maximum value. As the antenna continues to revolve to its most northerly position, the frequency decreases from the maximum value to a value corresponding to the angular velocity $\omega$. Accordingly, the signal transmitted due north has an effective angular velocity as derived from Equations 2 and 11 of $$\omega - \frac{\omega_r \omega d}{c} \sin \omega_r t$$

The frequency of a signal intercepted by a receiver due east of the antenna system ($\theta=90$) similarly varies in a sinusoidal manner but reaches a maximum value when the antenna 12 is at its most northerly position and reaches a minimum value when the antenna 12 is at its most southerly position. Thus, the variations in the frequency of the signal intercepted by the eastern receiver are 90° out of phase with the variations in the frequency of the signal intercepted by the northern receiver. Thus, the signal transmitted due east has an effective angular velocity as derived from Equations 2 and 11 of $$\omega + \frac{\omega_r \omega d}{c} \cos \omega_r t$$

Accordingly, the effective frequency of the signal translated by the revolving antenna 12, 12 varies in a manner representative of the direction of propagation thereof.

The stationary antenna 21, 21 translates a signal having the same effective frequency in all directions to provide at the various receivers a reference signal for comparison with the signal translated by the antenna 12, 12. During the revolutions of the antenna 12, 12 the motor 25 rotates the cam 26, periodically to interrupt the transmission of an output signal by the antenna 21, 21 for a purpose described hereinafter. For example, each time the antenna 12 passes through its most northerly position the cam 26 momentarily opens the switch 27 to interrupt the application of the output signal of the frequency multiplier 20 to the antenna 21.

From the foregoing explanation, it will be seen that the transmitting system transmits two signals having effective relative angular velocities representative of the direction of propagation thereof.

*Description of Fig. 2 receiver*

The receiver represented in Fig. 2 may be utilized in conjunction with the Fig. 1 transmitting system and may be located, for example, aboard an aircraft for receiving the signals transmitted by the Fig. 1 system to indicate the relative positions of the aircraft and the Fig. 1 transmitting system. The Fig. 2 receiver comprises a high-frequency dipole omnidirectional antenna 30, 30 connected to the input circuit of a conventional radio-frequency amplifier 31 to which are coupled, in cascade and in the order named, an oscillator-modulator 32, an intermediate-frequency amplifier 33, an amplitude detector 34 and a frequency detector 35. Units 31–35, inclusive, may all be of conventional construction and operation and a detailed description thereof is deemed unnecessary herein.

The frequency-detector circuit 35 is coupled through a low-pass filter 36, which may have a cutoff frequency of, for example, 1000 cycles, to a phase-splitting circuit 37 of conventional construction for deriving from a single-phase input signal two output signals having a 90° phase difference therebetween. The phase-splitting circuit is connected to the stator windings 38, 39 of a two-phase adjustable phase-shifting circuit 58 which may comprise a suitable synchro having a rotor winding 40. The rotor winding 40 is connected to the input circuit of a phase comparator 41 comprising an input transformer 42 connected to the anodes of a pair of diodes 43, 44 having the cathodes thereof coupled together through a pair of resistor-condenser networks 45, 46 and 47, 48. The output terminals of the phase comparator are connected to a phase balance meter 49 which may be a conventional direct-current voltmeter.

The frequency detector 35 is also coupled through a high-mass filter 50 having a cutoff frequency of, for example, 1500 cycles to a conventional pulse clipper 59 for providing output pulses in response to input pulses of a predetermined polarity only. The pulse clipper 59 is connected to a resonant circuit 51 tuned to the frequency of revolution of the antenna 12 of the Fig. 1 transmitting system. The resonant circuit 51 is connected to a mid-point of the secondary winding of the transformer 42 and to the junction of the networks 45, 46 and 47, 48. The resonant circuit is also connected to a phase comparator 53 which, preferably, is of similar construction to the phase comparator 41 and which has an input circuit coupled to the rotor winding 40 through a 90° phase-shifting network 52. The output circuit of the phase comparator 53 is connected to an ambiguity resolver 54 comprising a direct-current voltmeter similar to the phase balance meter 49.

A manually rotatable handle 55 is mechanically connected to the rotor winding 40, as indicated by a dot-dash line 56. Also connected to the handle 55 is a pointer of a suitable indicator 57 which is provided with a calibrated azimuth scale.

Operation of Fig. 2 receiver

Assume that the receiver of Fig. 2 is aboard an aircraft due east of the Fig. 1 transmitting system. The antenna 30, 30 then intercepts the signal having an angular velocity of $(\omega - \omega_1)$ transmitted by the antenna 21, 21 of the Fig. 1 embodiment and expressed by Equation 9. The antenna 30, 30 also intercepts a signal having an effective angular velocity of $$\omega + \frac{\omega_r \omega d}{c} \cos \omega_r t$$

This signal is that transmitted due east by the revolving antenna 12, 12 of the Fig. 1 embodiment and the angular velocity thereof may be derived from the angular velocities expressed in Equations 2 and 11, as mentioned previously. These intercepted signals are amplified by the radio-frequency amplifier 31 and applied to the oscillator-modulator 32 which derives therefrom similar signals having frequencies in the intermediate-frequency range. The intermediate-frequency amplifier 33 amplifies the signals applied thereto by the oscillator-modulator 32 and applies the amplified signals to the amplitude detector 34 wherein the intermediate-frequency signals beat together to develop a difference-frequency signal having an angular velocity of $$\omega_1 + \frac{\omega_r \omega d}{c} \cos \omega_r t$$

The frequency of the output signal of the detector 34, therefore, varies sinusoidally in accordance with the movement of the transmitting antenna 12 of the Fig. 1 embodiment. For example, the frequency of the output signal of the amplitude detector 34 may cyclically vary from about 200 to 600 cycles at a 30 cycle rate. This varying frequency signal is applied to the frequency detector 35 which derives therefrom a variable phase signal having a frequency, for example 30 cycles, equal to the frequency of revolution of the antenna 12, 12 of the Fig. 1 embodiment and having a phase determined by the relative positions of the Fig. 2 receiver and the Fig. 1 transmitting system. This is so because, as explained in connection with the operation of the Fig.1 embodiment, the effective relative angular velocities of the signals transmitted by the antennas 12, 12 and 21, 21 vary in such a manner that the phase of the cyclical variations of the effective instantaneous relative angular velocities varies with the direction of propagation, that is, with changes of $\theta$ of Equation 11.

Because of the periodic interruption of the transmission of the signal developed by the frequency multiplier 20 of the Fig. 1 embodiment, the output signal of the frequency detector 35 of the Fig. 2 embodiment also includes high-frequency components effectively providing pulses having a repetition frequency equal to the frequency of revolution of the antenna 12, 12 of Fig. 1, for example, 30 cycles. The low-pass filter 36 passes the variable-phase 30-cycle signal component applied thereto by the frequency detector 35 to the phase-splitting circuit 37 which derives therefrom a two-phase signal for application to the synchro stator windings 38, 39. A resultant signal having a phase dependent on the position of the rotor winding 40 relative to the stator windings is applied thereby to the input transformer 42 of the phase comparator 41.

The high-pass filter 50 has a sufficiently high cutoff frequency to differentiate the output signal of the frequency detector 35 and derive positive and negative differentiated pulses from the high-frequency or pulse components of the output signal of the frequency detector 35. These differentiated pulses are applied by the high-pass filter 50 to the pulse clipper 59 which provides output pulses in response to applied pulses of a predetermined polarity only. The output pulses of the pulse clipper 59 shock excite the resonant circuit 51 to cause it to ring at a frequency of 30 cycles, the phase of the output signal of the resonant circuit 51 being determined by the times of occurrence of the applied pulses. Since the pulses occur when the antenna 12 of the Fig. 1 embodiment is at its most northerly position because of the operation of the cam 26, the resonant circuit 51 of Fig. 2 develops a signal having a maximum amplitude at the time the antenna 12, 12 passes through its most northerly position. This signal is in phase with the signal applied to the phase-splitting circuit 37 by the low-pass filter 36 since the latter signal also has a maximum amplitude at the time the antenna passes through its most northerly position. After proper initial adjustment of the relative positions of the rotor winding 40 and the handle 55, the rotor winding 40 develops a signal 90° out of phase with the input signal to the phase-splitting circuit 37 when the handle is turned to provide an indication of 90° on the scale of the indicator 57. The phases of the input signals to the phase comparator 41 then differ by 90° and the diodes 43 and 44 conduct during equal portions of each cycle of the input signals to develop across the condensers 46 and 48 unidirectional voltages of equal amplitude but opposite polarity. Accordingly, under the assumed operating conditions, there is no voltage applied to the phase balance meter 49 which then gives a zero indication.

Assume for the moment, however, that the handle 55 is so turned that the indicator 57 incorrectly indicates, for example, 45°. The phase of the signal developed by the rotor 40 then does not differ by 90° from the phase of the signal developed by the resonant circuit 51. Accordingly, the diodes 43 and 44 conduct during unequal portions of the cycles of the input signals and voltages of unequal amplitude are developed across the condensers 46 and 48 causing an indication other than zero on the phase balance meter 49. By turning the handle 55 to 90°, the phase balance meter 49 may be caused to give a zero indication as explained above and thus the bearing of the receiver relative to the Fig. 1 transmitting system may be read directly from the scale of the indicator 57.

Readings on the indicator 57 are not unique indications, however, when only the phase balance meter is employed since the phase comparator 41 will cause a zero indication on the meter 49 in response to signals propagated in directly opposite directions. Accordingly, the relative positions of the transmitting system and receiver cannot conveniently be determined unambiguously by the use of a single phase-indicating meter. For this reason, the signal developed by the rotor winding 40 is also applied through the 90° phase-shifting network 52 to the phase comparator 53 which develops output signals of opposite polarities, in response to signals propagated in opposite directions, when the handle 55 is adjusted to cause a zero indication on the meter 49. The output signal of the phase comparator 53 is applied to the ambiguity resolver 54 which indicates the polarity of the output signal of the phase comparator 63 and, hence, is indicative of the proper reading of the indicator 57.

*Description of Fig. 3 direction-finding receiver*

Referring now to Fig. 3 of the drawings, there is represented a direction-finding receiver which may be located aboard an aircraft and which includes an antenna system constructed in accordance with a particular form of the invention. The antenna system comprises a stationary antenna 60, 60 attached to a suitable fixed and insulated support 61 and a movable antenna 62, 62 conductively attached by a pair of transverse arms to a rotatable support 63 comprising a section of rigid coaxial transmission line. A motor 64 is mechanically connected, as indicated by a dot-dash line 65, to the transmission line support 63 for cyclically moving the movable antenna in a nonlinear path, preferably a circular path of, for instance, 15 centimeters radius. The antenna system is responsive to primary wave-signal energy comprising a propagated signal in, for example, the 1000 megacycle range and is generally similar to the antenna system of the Fig. 1 transmitting system.

The antenna 60 is coupled in cascade, and in the order named, to a radio-frequency amplifier 85, a modulator 86, and an intermediate-frequency amplifier 87 tuned to, for example, 30 megacycles. A local oscillator 84 is connected to an input circuit of the modulator 86 for supplying a heterodyne signal thereto. Units 84–87, inclusive, may all be of conventional construction and operation so that a further description thereof is deemed unnecessary herein. The intermediate-frequency amplifier 87 is connected to the input circuit of a conventional balanced modulator 66 having another input circuit connected to the output circuit of an audio-frequency oscillator 67 which may provide an output signal having a frequency of, for example, 400 cycles. The intermediate-frequency amplifier 87 and the audio-frequency oscillator 67 are also coupled through suitable 90° phase-shifting networks 68 and 69, respectively, to the input circuits of a balanced modulator 70 which may be similar in construction to the balanced modulator 66. The output circuits of the balanced modulators 66 and 70 are connected to a suitable adder circuit 80 which may be similar in construction to the adder circuit 19 of the Fig. 1 embodiment. The adder circuit is connected to an input circuit of a balanced modulator 71 of conventional construction. The movable antenna 62, 62 is coupled through a pair of brushes 72, 72, in cascade and in the order named, to a radio-frequency amplifier 81, a modulator 82 and an intermediate-frequency amplifier 83. The local oscillator 84 is connected to an input circuit of the modulator 82 for supplying a heterodyne signal thereto. Units 81–83, inclusive, may be of similar construction to units 85–87, inclusive. The intermediate-frequency amplifier 83 is connected to another input circuit of the balanced modulator 71 for applying thereto the signal translated by the antenna 62, 62.

The output circuit of the balanced modulator 71 is coupled through a low-pass filter 73 having a cutoff frequency of, for example, 1000 cycles to a frequency detector 74 of conventional construction for deriving the frequency variation components of the signal applied thereto. The output circuit of the frequency detector 74 is coupled through a phase-splitting circuit 37', an adjustable phase-shifting circuit 58' and a phase comparator 41' to a phase balance meter 49'. A sinusoidal-signal generator 75 driven by the motor 64, as indicated by the dot-dash line 76, is also connected to an input circuit of the phase comparator 41'. The output circuit of the adjustable phase-shifting circuit 58' is coupled to a 90° phase-shifting network 52', a phase comparator 53' and an ambiguity resolver 54'. Sinusoidal-signal generator 75 is also connected to an input circuit of the phase comparator 53'. The movable element of the adjustable phase-shifting circuit is connected to a handle 55', as indicated by a dot-dash line 56', and to a suitable indicator 57'. Units 37', 41', 49', 52'–54', inclusive, and 58' and elements 55'–57', inclusive, may be generally similar in construction and operation to the correspondingly numbered units and elements of the Fig. 2 receiver and, hence, a detailed description thereof is deemed unnecessary.

*Operation of Fig. 3 direction-finding receiver*

During the operation of the Fig. 3 receiver, a signal transmitted by a ground station and intercepted by the stationary antenna 60, 60 of the direction-finding receiver is amplified in the radio-frequency amplifier 85 which applies the amplified output signal thereof to the modulator 86 for conversion to a corresponding intermediate-frequency signal by beating with the output signal of the local oscillator 84. The intermediate-frequency signal developed in the modulator 86 is translated by the intermediate-frequency amplifier 87 to the balanced modulator 66. The audio-frequency oscillator 67 also applies an input signal to the balanced modulator 66 which, in response to the signals applied thereto, develops an output signal representative of the product of the applied signals.

The intermediate-frequency amplifier 87 and the audio-frequency oscillator 67 also apply the signals translated thereby to the input circuits of the balanced modulator 70 through the 90° phase-shifting networks 68 and 69, respectively. The balanced modulator 70 then develops a signal representative of the product of the signals applied thereto. The signals developed by the balanced modulators 66 and 70, respectively, are applied to the adder circuit 80 which derives therefrom a signal represented by:

$$e_{12} = E_{12} \cos (\omega_3 - \omega_4) t \qquad (12)$$

where $e_{12}$ = instantaneous value of the output signal of unit 80

$E_{12}$ = amplitude of the output signal of unit 80

$\omega_3$ = angular velocity of the intermediate-frequency output signal of unit 87

$\omega_4$ = angular velocity of the audio-frequency output signal of unit 67

Because of the Doppler effect mentioned previously and assuming that the antenna 62, 62 revolves clockwise about the longitudinal axis of the transmission line support 63, the signal translated by the antenna 62, 62 and amplified by the radio-frequency amplifier 81 has a variable angular velocity and may be written:

$$e_{13} = E_{13} \sin \left[ \omega_2 + \frac{\omega_{r_1} \omega_2 d_1}{c} \sin (\omega_{r_1} t - \theta_1) \right] t \qquad (13)$$

where $e_{13}$ = instantaneous value of the output signal of unit 81

$E_{13}$ = amplitude of the output signal of unit 81

$\omega_2$ = angular velocity of the received wave signal intercepted by antennas 60, 60 and 62, 62

$\omega_{r_1}$ = angular velocity of revolution of antenna 62, 62

$d_1$ = length of radius of circular path of antenna 62, 62

$c$ = velocity of propagation of the received wave signal in free space $\theta_1$ = angle between the direction of propagation of the received wave signal and a reference direction The output signal of the radio-frequency amplifier 81 is converted in the modulator 82 to an intermediate-frequency signal which is amplified in the intermediate-frequency amplifier 83 and may be expressed by:

$$e_{14} = E_{14} \sin \left[ \omega_3 + \frac{\omega_{r_1} \omega_2 d_1}{c} \sin (\omega_{r_1} t - \theta_1) \right] t \quad (14)$$

where $e_{14}$ = instantaneous value of the output signal of unit 83

$E_{14}$ = amplitude of the output signal of unit 83

The output signal of the intermediate-frequency amplifier 83 is applied to the balanced modulator 71 which derives a signal representative of the product of the input signals applied thereto and represented by Equations 12 and 14. The output signal of the modulator 71 may be expressed by:

$$e_{15} = k_{15} E_{12} E_{14} \sin \left[ \omega_3 + \frac{\omega_{r_1} \omega_2 d_1}{c} \sin (\omega_{r_1} t - \theta_1) \right] t \cos (\omega_3 - \omega_4) t \quad (15)$$

where $e_{15}$ = instantaneous value of the output signal of unit 71

$k_{15}$ = amplification factor of unit 71

The low-pass filter 73 derives from the signal represented by Equation 15 the low-frequency components thereof expressed by:

$$e_{16} = E_{16} \sin \left[ \frac{\omega_{r_1} \omega_2 d_1}{c} \sin (\omega_{r_1} t - \theta_1) + \omega_4 \right] t \quad (16)$$

where $e_{16}$ = instantaneous value of the output signal of unit 73

$E_{16}$ = amplitude of the output signal of unit 73

This signal may have a frequency which varies, for example, from about 300 to 500 cycles at a 30-cycle rate. The frequency detector 74 derives a signal representative of the frequency variations of the output signal of the low-pass filter 73 and applies this signal to the phase-splitting circuit 37'.

The sinusoidal-signal generator 75 generates a signal having an angular velocity of $$\omega_{r_1}$$

as a reference signal for comparison with the signal derived by the frequency detector 74. Units 37', 41', 49' and 52'–54', inclusive, respond to the signals applied thereto by the frequency detector 74 and the sinusoidal-signal generator 75 in the same manner that the corersponding units of the Fig. 2 receiver respond to the output signal of the low-pass filter 36 and the resonant circuit 51. Accordingly, a detailed explanation of the operation of the units of the Fig. 3 receiver is deemed unnecessary. The direction of propagation of the signal intercepted by the antenna system may be suitably indicated on the indicator 57' by adjustment of the adjustable phase-shifting circuit 58' to provide a zero indication on the phase balance meter 49' which may be read in conjunction with the indication provided by the ambiguity resolver 54'.

From the foregoing description, it will be apparent that a wave-signal transmitting system constructed in accordance with the invention has the advantage of transmitting two wave signals having in each direction of propagation effective instantaneous relative angular velocities representative of the direction of propagation and of utilizing a relatively simple antenna system constructed in accordance with the invention for deriving the two wave signals.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A wave-signal transmitting system for transmitting two wave signals having in each direction of propagation effective instantaneous relative angular velocities representative of the direction of propagation comprising: a circuit for substantially simultaneously supplying two wave signals having different frequencies; a pair of antennas individually and substantially simultaneously responsive to said supplied signals for deriving therefrom wave signals for transmission, one of said antennas being movable along a circular path and the other of said antennas being stationary, said one antenna having a velocity in each direction of propagation of said transmitted signals relative to said other antenna which varies in accordance with displacements along said path; driving means for cyclically moving said one antenna along said path at a constant speed and at a frequency less than the quotient of the product of the frequency difference of said two supplied signals and the velocity of propagation thereof in free space divided by the product of the length of said path and the frequency of the signal supplied to said movable antenna, thereby cyclically to vary in accordance with variations of said relative velocity of said one antenna the effective instantaneous relative angular velocities of said transmitted signals in each direction of propagation, said instantaneous relative angular velocities of said transmitted signals in any direction of propagation being representative of said direction; and means for interrupting the transmission of one of said transmitted signals during a predetermined portion of each cycle of movement of said one antenna periodically to represent the relative positions of said antennas.

2. A wave-signal transmitting system for transmitting two wave signals having in each direction of propagation effective instantaneous relative angular velocities representative of the direction of propagation comprising: a circuit for substantially simultaneously supplying two wave signals; at least a pair of antennas individually and substantially simultaneously responsive to said supplied signals for deriving therefrom wave signals for transmission; the effective position of derivation of one of said transmitted signals by at least one of said antennas being movable along a nonlinear path and having a velocity in each direction of propagation of said transmitted signals relative to the other of said antennas which varies in accordance with displacements along said path; and means for cyclically moving said effective signal-deriving position along said path cyclically to vary in accordance with variations of said relative velocity of said position the effective instantaneous relative angular velocities of said transmitted signals in each direction of propagation, said instantaneous relative angular velocities of said transmitted signals in any direction of propagation being representative of said direction.

3. A wave-signal transmitting system for transmitting two wave signals having in each direction of propagation effective instantaneous relative angular velocities representative of the direction of propagation comprising: a circuit for substantially simultaneously supplying two wave signals; a pair of antennas individually and substantially simultaneously responsive to said supplied signals for deriving therefrom wave signals for transmission, at least one of said antennas being movable along a nonlinear path and having a velocity in each direction of propagation of said transmitted signals relative to the other of said antennas which varies in accordance with displacements along said path; and driving means for cyclically moving said one antenna along said path cyclically to vary in accordance with variations of said relative velocity of said one antenna the effective instantaneous relative angular velocities of said transmitted signals in each direction of propagation, said instantaneous relative angular velocities of said transmitted signals in any direction of propagation being representative of said direction.

4. A wave-signal transmitting system for transmitting two wave signals having in each direction of propagation effective instantaneous relative angular velocities representative of the direction of propagation comprising: a circuit for substantially simultaneously supplying two wave signals; a pair of antennas individually and substantially simultaneously responsive to said supplied signals for deriving therefrom wave signals for transmission, at least one of said antennas being movable along a nonlinear path and having a velocity in each direction of propagation of said transmitted signals relative to the other of said antennas which varies in accordance with displacements along said path; and driving means for cyclically moving said one antenna along said path cyclically to vary in accordance with variations of said relative velocity of said one antenna the effective instantaneous relative angular velocities of said transmitted signals in each direction of propagation, the phase of the cyclical variations of said instantaneous relative angular velocities of said transmitted signals at any given point being representative of the direction from said antennas to said point.

5. A wave-signal transmitting system for transmitting two wave signals having in each direction of propagation effective instantaneous relative angular velocities representative of the direction of propagation comprising: a circuit for substantially simultaneously supplying two wave signals having different frequencies; a pair of antennas individually and substantially simultaneously responsive to said supplied signals for deriving therefrom wave signals for transmission, at least one of said antennas being movable along a circular path and having a velocity in each direction of propagation of said transmitted signals relative to the other of said antennas which varies in accordance with displacements along said path; and driving means for cyclically moving said one antenna along said path at a frequency less than the quotient of the product of the frequency difference of said two supplied signals and the velocity of propagation thereof in free space divided by the product of the length of said path and the frequency of the signal supplied to said movable antenna, thereby cyclically to vary in accordance with variations of said relative velocity of said one antenna the effective instantaneous relative angular velocities of said transmitted signals in each direction of propagation, said instantaneous relative angular velocities of said transmitted signals in any direction of propagation being representative of said direction.

6. A wave-signal transmitting system for transmitting two wave signals having in each direction of propagation effective instantaneous relative angular velocities representative of the direction of propagation comprising: a circuit for substantially simultaneously supplying two wave signals; a pair of antennas individually and substantially simultaneously responsive to said supplied signals for deriving therefrom wave signals for transmission, at least one of said antennas being movable along a nonlinear path and having a velocity in each direction of propagation of said transmitted signals relative to the other of said antennas which varies in accordance with displacements along said path; driving means for cyclically moving said one antenna along said path cyclically to vary in accordance with variations of said relative velocity of said one antenna the effective instantaneous relative angular velocities of said transmitted signals in each direction of propagation, said instantaneous relative angular velocities of said transmitted signals in any direction of propagation being representative of said direction; and means for interrupting the transmission of one of said transmitted signals during a predetermined portion of each cycle of movement of said one antenna periodically to represent the relative positions of said antennas.

7. An antenna system responsive to primary wave-signal energy for deriving therefrom two wave signals having cyclically varying effective relative angular velocities comprising: at least a pair of antennas individually and substantially simultaneously responsive to said primary wave-signal energy for deriving therefrom wave-signal energy comprising two wave signals, one of said primary and said derived wave-signal energies being propagated energy; the effective position of derivation of one of said signals by at least one of said antennas being movable along a nonlinear path and having during the entire operating period of the system a variable displacement component in each direction of propagation of said propagated energy and having during said entire operating period a velocity in each direction of propagation of said propagated energy relative to the other of said antennas which varies in accordance with displacements along said path; and means for cyclically moving said effective signal-deriving position along said path cyclically to vary the effective instantaneous relative angular velocities of said two derived signals, said instantaneous relative angular velocities of said derived signals corresponding to any direction of propagation of said propagated energy being representative of said direction.

8. An antenna system responsive to primary wave-signal energy for deriving therefrom two wave signals having cyclically varying effective relative angular velocities comprising: a pair of antennas individually and substantially simultaneously responsive to said primary wave-signal energy for deriving therefrom wave-signal energy comprising two wave signals, one of said primary and said derived wave-signal energies being propagated energy and at least one of said antennas being movable along a non-linear path and having during the entire operating period of the system a variable displacement component in each direction of propagation of said propagated energy and having said entire operating period a velocity in each direction of propagation of said propagated energy relative to the other of said antennas which varies in accordance with displacements along said path; and driving means for cyclically moving said one antenna along said path cyclically to vary the effective instantaneous relative angular velocities of said two derived signals said instantaneous relative angular velocities of said derived signals corresponding to any direction of propagation of said propagated energy being representative of said direction.

9. An antenna system responsive to primary wave-signal energy for deriving therefrom two wave signals having cyclically varying effective relative angular velocities comprising: a pair of antennas each comprising a substantially coaxial vertical-dipole antenna and each being responsive to said primary wave-signal energy substantially simultaneously with the other antenna for deriving therefrom wave-signal energy comprising two wave signals, one of said primary and said derived wave-signal energies being propagated energy and at least one of said antennas being movable along a non-linear horizontal path and having during the entire operating period of the system a variable displacement component in each direction of propagation of said propagated energy and having said entire operating period a velocity in each direction of propagation of said propagated energy relative to the other of said antennas which varies in accordance with displacements along said path; and driving means for cyclically moving said one antenna along said path cyclically to vary the effective instantaneous relative angular velocities of said two derived signals, said instantaneous relative angular velocities of said derived signals corresponding to any direction of propagation of said propagated energy being representative of said direction.

10. An antenna system responsive to primary wave-signal energy for deriving therefrom two wave signals having cyclically varying effective relative angular velocities comprising: a pair of antennas individually and substantially simultaneously responsive to said primary wave-signal energy for deriving therefrom wave-signal energy comprising two wave signals, one of said primary and said derived wave-signal energies being propagated energy and at least one of said antennas being movable along a closed curvilinear path and having during the entire operating period of the system a variable displacement component in each direction of propagation of said propagated energy and having during said entire operating period a velocity in each direction of propagation of said propagated energy relative to the other of said antennas which varies in accordance with displacements along said path; and driving means for cyclically moving said one antenna along said path cyclically to vary the effective instantaneous relative angular velocities of said two derived signals, said instantaneous relative angular velocities of said derived signals corresponding to any direction of propagation of said propagated energy being representative of said direction.

11. An antenna system responsive to primary wave-signal energy for deriving therefrom two wave signals having cyclically varying effective relative angular velocities comprising: a pair of antennas individually and substantially simultaneously responsive to said primary wave-signal energy for deriving therefrom wave-signal energy comprising two wave signals, one of said primary and said derived wave-signal energies being propagated energy and at least one of said antennas being movable along a circular path and having during the entire operating period of the system a variable displacement component in each direction of propagation of said propagated energy and having during said entire operating period a velocity in each direction of propagation of said propagated energy relative to the other of said antennas which varies in accordance with displacements along said path; and driving means for cyclically revolving said one antenna along said path at a constant speed cyclically to vary the effective instantaneous relative angular velocities of said two derived signals, said instantaneous relative angular velocities of said derived signals corresponding to any direction of propagation of said propagated energy being representative of said direction.

12. An antenna system responsive to primary wave-signal energy for deriving therefrom two wave signals having cyclically varying effective relative angular velocities comprising: a pair of omnidirectional antennas individually responsive to said primary wave-signal energy for deriving therefrom wave-signal energy comprising two wave signals, one of said primary and said derived wave-signal energies being propagated energy and one of said antennas being movable along a nonlinear path and the other of said antennas being stationary, said one antenna having during the entire operating period of the system a variable displacement component in each direction of propagation of said propagated energy and having during said entire operating period a velocity in each direction of propagation of said propagated energy relative to said other antenna which varies in accordance with displacements along said path; and driving means for cyclically moving said one antenna along said path cyclically to vary the effective instantaneous relative angular velocities of said two derived signals, said instantaneous relative angular velocities of said derived signals corresponding to any direction of propagation of said propagated energy being representative of said direction.

13. An antenna system responsive to primary wave-signal energy for deriving therefrom two wave signals having cyclically varying effective relative angular velocities comprising: a pair of omnidirectional antennas individually responsive to said primary wave-signal energy for deriving therefrom wave-signal energy comprising two wave signals, one of said primary and said derived wave-signal energies being propagated energy and at least one of said antennas being movable along a nonlinear path and having during the entire operating period of the system a variable displacement component in each direction of propagation of said propagated energy and having during said entire operating period a velocity in each direction of propagation of said propagated energy relative to the other of said antennas which varies in accordance with displacements along said path; and driving means for cyclically moving said one antenna along said path cyclically to vary the effective instantaneous relative angular velocities of said two derived signals at a frequency which is small relative to the frequencies of said derived signals, said instantaneous relative angular velocities of said derived signals corresponding to any direction of propagation of said propagated energy being representative of said direction.

14. A wave-signal radiating system for radiating two wave signals having cyclically varying effective relative angular velocities comprising: a pair of antennas for individually and substantially simultaneously radiating two wave signals, at least one of said antennas being movable along a nonlinear path and having a velocity in each direction of propagation of said radiated signals relative to the other of said antennas which varies in accordance with displacements along said path; and driving means for cyclically moving said one antenna along said path cyclically to vary the effective instantaneous relative angular velocities of said two radiated signals, said instantaneous relative angular velocities of said radiated signals in any direction of propagation being representative of said direction.

15. A wave-signal intercepting system for deriving from a propagated wave signal two wave signals having cyclically varying effective relative angular velocities comprising: a pair of antennas for individually intercepting said propagated wave signal to derive therefrom two wave signals, at least one of said antennas being movable along a nonlinear path and having during the entire operating period of the system a variable displacement component in each direction of propagation of said propagated signal and having during said entire operating period a velocity in each direction of propagation of said propagated signal relative to the other of said antennas which varies in accordance with displacements along said path; and driving means for cyclically moving said one antenna along said path cyclically to vary the effective instantaneous relative angular velocities of said two derived signals, said instantaneous relative angular velocities of said derived signals corresponding to any direction of propagation of said propagated signal being representative of said direction.

References Cited in the file of this patent

UNITED STATES PATENTS

| Number | Name | Date |
|---|---|---|
| 2,405,281 | Bemis | Aug. 6, 1946 |
| 2,414,798 | Budenbom | Jan. 28, 1947 |
| 2,481,509 | Hansel | Sept. 13, 1949 |
| 2,490,050 | Hansel | Dec. 6, 1949 |